United States Patent [19]
Glance

[11] Patent Number: 5,382,051
[45] Date of Patent: Jan. 17, 1995

[54] PNEUMATIC PADS FOR THE INTERIOR OF VEHICLES

[75] Inventor: Paul C. Glance, Troy, Mich.

[73] Assignee: Concept Analysis Corporation, Plymouth, Mich.

[21] Appl. No.: 751,146

[22] Filed: Aug. 28, 1991

[51] Int. Cl.$^6$ .................................................. B60R 21/04
[52] U.S. Cl. ........................... 280/751; 280/730 A; 280/743 R; 280/753; 296/189; 403/381
[58] Field of Search ............... 280/728, 729, 730, 731, 280/743, 748, 751, 752, 753, 770, 735, 742; 296/189; 403/381; 428/167

[56] References Cited

U.S. PATENT DOCUMENTS

| | | | |
|---|---|---|---|
| 1,331,359 | 2/1920 | Parrott et al. | 280/743 |
| 2,048,380 | 7/1936 | Hansen | 403/381 |
| 3,510,150 | 5/1970 | Wilfert | 280/733 |
| 3,791,666 | 2/1974 | Shibamoto | 280/729 |
| 3,797,855 | 3/1974 | Wright, Jr. | 280/743 |
| 3,843,150 | 10/1974 | Harada et al. | 280/729 |
| 3,945,665 | 3/1976 | Tsutsumi et al. | 280/731 |
| 4,360,223 | 11/1982 | Kirchoff | 280/729 |
| 4,413,856 | 11/1983 | McMahan et al. | 296/189 |
| 4,500,114 | 2/1985 | Grey, Jr. | 280/738 |
| 4,563,374 | 1/1986 | Treber et al. | 428/167 |
| 5,066,064 | 11/1991 | Garnweidner | 296/189 |

FOREIGN PATENT DOCUMENTS

| | | | |
|---|---|---|---|
| 2743356 | 4/1979 | Germany | 403/381 |
| 0306847 | 12/1990 | Japan | 280/743 |
| 2191450 | 12/1987 | United Kingdom | 280/730 |

*Primary Examiner*—Eric Culbreth
*Attorney, Agent, or Firm*—John A. Waters

[57] ABSTRACT

Pneumatic protective pads are provided for attachment to the interior vehicle structure. One form of the invention retains the pads in compressed deflated condition until the admission of gas under pressure in response to activation by a collision sensor. Another form of the invention involves restrictive passages within a pneumatic chamber for highly damped absorption of the energy of cushioning the forces from crash conditions. Another form of the invention involves integrally molded pockets, posts, ribs, and convolute side walls which progressively deform to provide efficient energy absorption.

7 Claims, 5 Drawing Sheets

PNEUMATIC PADS FOR THE INTERIOR OF VEHICLES

BACKGROUND OF THE INVENTION

Resilient pads have been used to protect vehicle occupants from violent contact with the interior structure of the vehicle. Air bags have become quite common as a means of protecting front-seat occupants in a head-on collision. These offer significant protection from injury caused by contact with the windshield, the dashboard structure, and the steering wheel. Broadside and rollover accidents, however, subject the occupants to significant danger from contact with the body pillars, the roof structure, and the door headers, and these have not been provided with significant protection for various reasons. Pads of sponge rubber, or some structurally equivalent material, have occasionally been used over some of these hard and rigid surfaces, but space requirements in the vehicle prevent the use of thick enough pads of such material to seriously reduce the risk of injury in an accident. Another problem with cushioning materials is the tendency to retain the energy of impact deformation, and thus cause a rebound effect as the vehicle occupant is thrown back into a secondary impact against some other surface. Ideally, the impact energy should be dissipated somehow, so that the forces generated by the return of the pad to its un-deformed condition are substantially less than those previously causing the deformation.

These functional requirements are somewhat complicated by the practical necessity of having the pad easily attachable to the vehicle structure, and provide an appearance consistent with the interior decor. These latter requirements can usually be satisfied by the use of molded materials having selected colors and surface configuration.

SUMMARY OF THE INVENTION

This invention provides pneumatic pads of various configurations that are attachable to the interior structure of a vehicle to protect the occupants. The pads are formed from an elastomeric material providing chambers containing air or other gas, and are preferably provided with snap-in projections engageable with the vehicle structure. In one form of the invention, the chambers are retained in compressed deflated condition until inflated by the admission of gas pressure controlled by a collision-responsive sensor. In another form of the invention, the chambers are provided with restricted passages limiting the flow out from the chamber to provide shock-absorbing energy dissipation to reduce the rebound effect. Buckling convoluted side walls, posts, pockets and webs produce efficient square wave force-deflection energy absorption.

DESCRIPTION OF THE DRAWINGS

FIG. 3 shows the deployed (inflated) condition.

FIG. 9 shows the deployed condition.

FIG. 14 illustrates one arrangement for securing the pad to a flange on the vehicle structure.

FIG. 16 illustrates the deployed condition of the pad.

DESCRIPTION OF THE PREFERRED EMBODIMENTS

Figure 1:
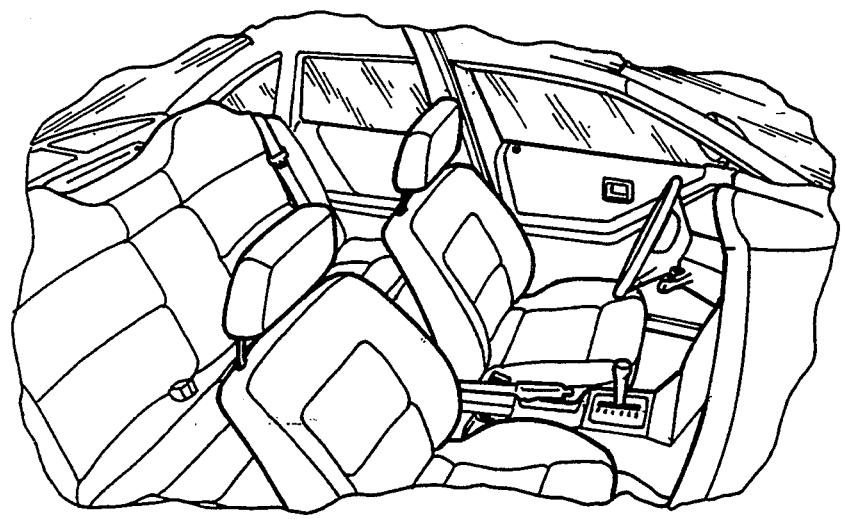
FIG. 1 is a fragmentary perspective view of the interior of a vehicle, illustrating the portions of the structure that may be protected by the present invention.
Figure 2:
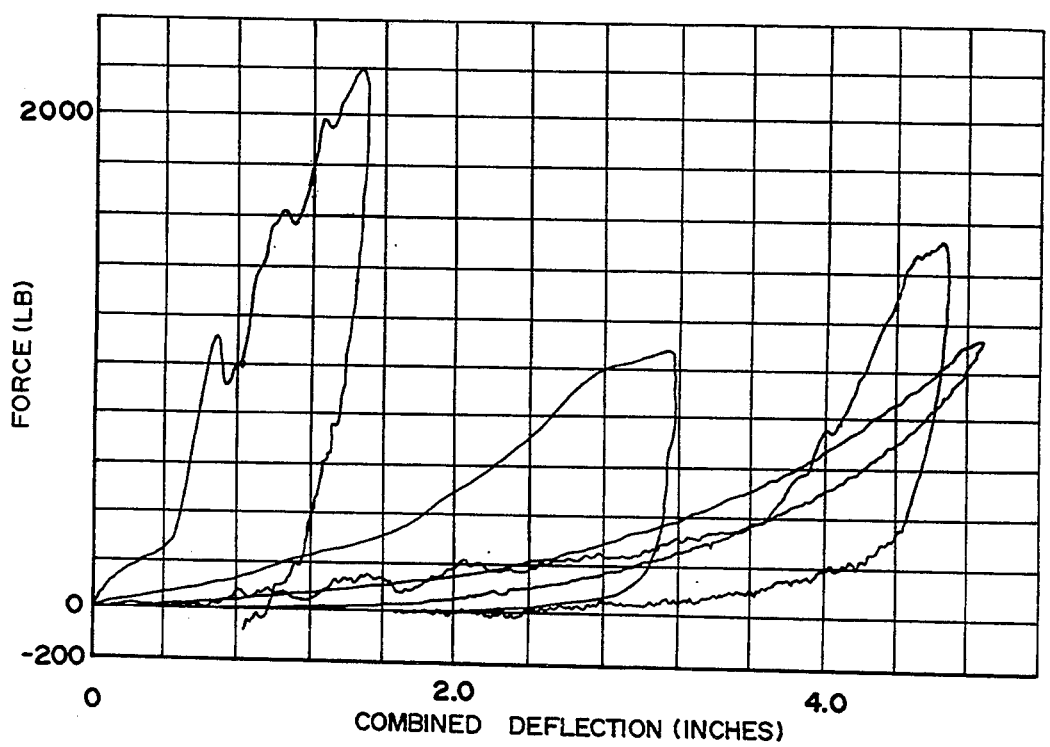
FIG. 2 is a chart showing the relationship of impact force and deflection of the vehicle structure, and also these same characteristics of various forms of the protective pad.

Referring to the drawings, the vehicle indicated at 10 shown in FIG. 1 has areas indicated at 11 on the header rail or pillars, which are typical sites of the installation of the pad configurations provided by this invention. FIG. 2 displays the test results of the impact of a standard head form against a selected portion of a typical vehicle body structure. The "HIC" referred to in the text associated with FIG. 2 indicates "head injury criterion" as defined by U.S. Department of Transportation safety standards. This is a relative quantity giving some degree of indication of the effects of equipping the rigid vehicle structure with protective pads of various types.

Figure 14:
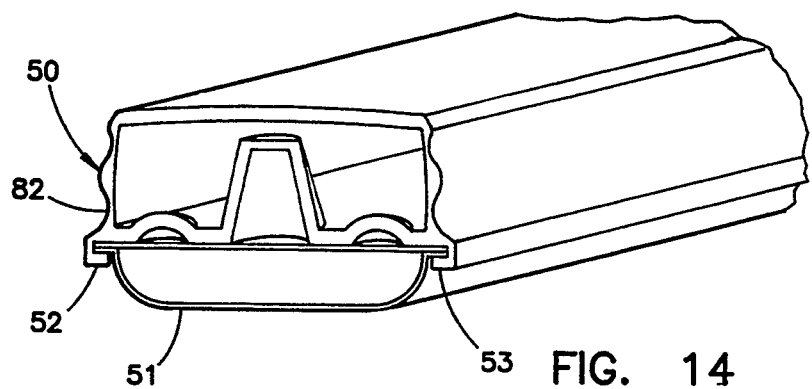
FIG. 14 illustrates a modification similar to FIG. 12, but without a port leading into the sub-chamber provided by the offset in the base of the pad.
Figure 15:
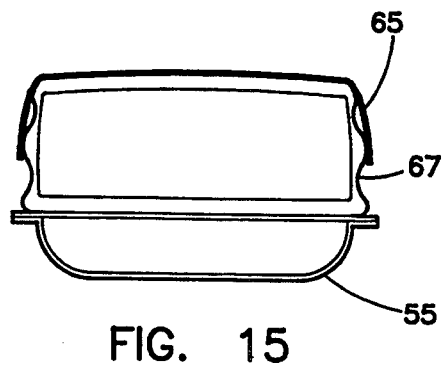
FIG. 15 illustrates a simple form of the pad, and an adhesive attachment of a flexible cover for maintaining the compressed condition of the pad, to be pulled away by inflation to the deployed condition shown.

The term "PSIG" indicates gauge pressure within the pad. The results of the study demonstrate that a significant reduction in HIC can be achieved by incorporating air pads. In particular, for a typical stiff "A-pillar" having a base stiffness of 2,730 lbs./inch, the HIC was reduced from 2,740 to 750 for a 20 miles per hour, 10 lb. (6.5 inches diameter) spherical head form drop impact. The most cost-effective air pad was found to be a blow-molded long tube with integral bellows containing only atmospheric pressure, and molded in a high-elongation elastomeric material. This permanently inflated air pad was the lowest cost alternative, since no acceleration sensor or gas inflators are required. A packaging thickness of 3.2 to 2 inches is typically required, depending on location and performance desired. This design approach may not be space-efficient enough for all passenger cars. This form of air pad will result in a small cost penalty, and achieve typically a 2.5 to 3.5 reduction in HIC. FIGS. 11-15 show embodiments of this air pad with integrally formed pockets 80 and 81, convoluted side walls 82, ribs 83, designed to buckle during impact and produce an efficient square wave force-deflection as shown in FIG. 2 curve D, which is superior to air pads of curve B and C. Since the peak force is lower, the rebound force is much lower, the energy absorbed (area enclosed by the curves) is larger, and the required packaging space (combined deflection) is much less. An outer flexible skin covering 65 shown in FIG. 15 may be attached to the elastomeric air pad via adhesive bonding and/or folding underneath the rear surface of the air pad 67. The outer skin covering serves to meet automotive styling, aging, life, color, and weatherability functions, and does not interfere with the operation of the air pad. The cover is initially attached in the compressed condition of the pad, and simply tears loose as the pad is inflated as shown in FIG. 15.

The most cost-effective air pad requiring less than one-half inch of un-deployed thickness was found to be a long blow-molded air pad with accordion-pleated side walls which could be inflated just prior to occupant impact (less than 50 milliseconds) by conventional contact or inertial sensors in the vehicle structure and a separate gas inflator. The air pad would preferably remain inflated to allow multiple hits. The inflated air pad would typically expand to 5.0 to 2.52 inches of thickness under a gas pressure of between 10 and 5 psig, and would be designed to not interfere with occupant visibility or egress from the vehicle. The performance of this inflatable air pad is shown in FIG. 2 curve B.

These pneumatic pads can be formed with a variety of standard techniques, such as blow-molding, extrusion, injection molding, hot stamping, and possibly others. Elastomeric materials marketed under the trademarks HYTREL, LOMAR, and RITEFLEX have been found very effective for these applications. A thermoplastic elastomeric material, preferably a crystalline thermoplastic polyester, is one material class recommended. Color and grained surface configurations can be incorporated in the molding process, and thus can replace some of the standard covering material otherwise present in the vehicle interior.

Figure 3:
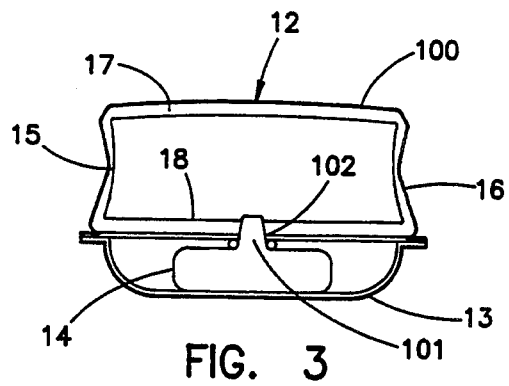
FIG. 3 is a cross-section of a simple form of a pad, installed in conjunction with an inertia-responsive, or contact sensor-responsive, inflator. The section is typical at a side pillar of a vehicle.
Figure 4:
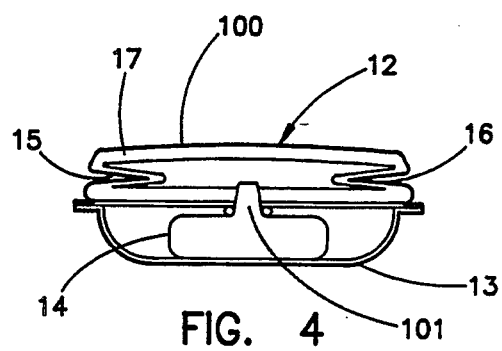
FIG. 4 is a view of the structure shown in FIG. 3, shown in the un-deployed condition.

Referring to FIGS. 3 and 4, the air pad body indicated at 12 is shown installed on the header or pillar 13 of the vehicle. Air pad body 12 comprises a base wall 18 that fits against the header or pillar, side walls 15 and 16 extending outwardly therefrom, and outer wall 17 extending between the sidewalls and forming a pneumatic air chamber in the body. The inflator 14 and one way pressure valve 101, which snap fits into opening 102, is mounted on the interior of the pillar, and is adapted to expand the pad from the un-deployed condition shown in FIG. 4 to the deployed condition of FIG. 3. The surface 100 may be painted or otherwise decorated. The accordion-pleated side walls 15 and 16 are typically from 0.04 inches to 0.015 inches in wall thickness, with the compressed condition shown in FIG. 4 providing a total pad thickness on the order of a half an inch. The outer wall 17 should be on the order of 0.09 inches in wall thickness to give proper surface characteristics. Alternatively, the air pad can be covered by a flexible skin covering or paint.

Figure 5:
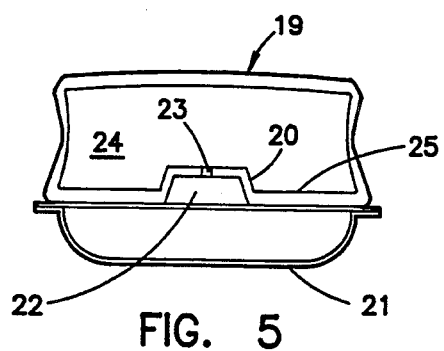
FIG. 5 illustrates a modified form of the invention in the deployed condition, showing the use of a restricted exhaust gas passage to reduce rebound.
Figure 6:
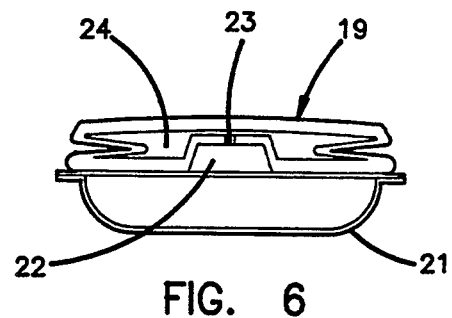
FIG. 6 is a view of the structure shown in FIG. 5 in the un-deployed condition.

The form of the invention illustrated in FIG. 5 shows the pad 19 with a central offset ridge 20 defining (in conjunction with the header rail or pillar 21) a passage 22 which communicates with the port 23 on the order of a quarter of an inch in diameter leading into the interior of the chamber 24 defined by the body portion of the pad. Normally, the wall 25 of the pad will not be air-sealed against the pillar 21, so that the port (or ports) 23 provide an egress for gases from the chamber 24. The expulsion of the gaseous contents of the chamber 24 through the port 23 and the passage 22, and thence between the wall 25 and the pillar 21, provides a degree of energy absorption that reduces the rebound effect. With this arrangement, the inflator can either expel its contents suddenly enough into the channel 22 (providing there are a sufficient number of ports 23), or may be installed so that the flow of the inflator traverses an opening in the mounting wall 25 of the pad set off to one side of the passage 22. The inflator is not shown in FIGS. 5 and 6, and may be considered located at a position different from the plane of the section in which these figures are taken.

Figure 7:
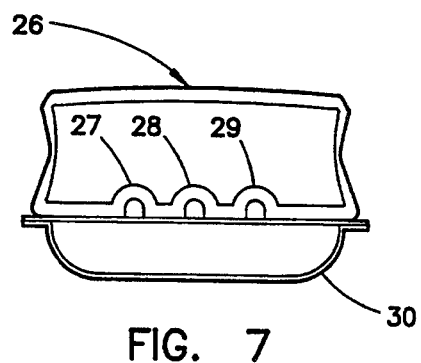
FIG. 7 illustrates a further modification of the invention, showing the use of a wave-shaped configuration on the mounting surface of the pad, in the deployed condition.
Figure 8:
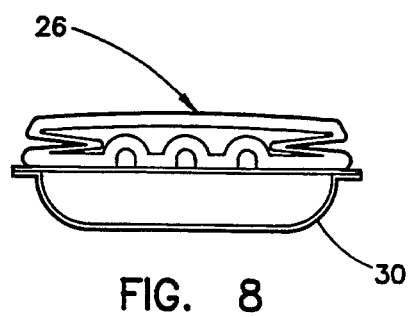
FIG. 8 shows the FIG. 7 modification in the un-deployed condition.

FIGS. 7 and 8 show another form of inflatable pad construction, with the sort of inflators shown in FIGS. 3 and 4 being located out of the plane of these views. In FIGS. 7 and 8, the pad 26 has a wave-shaped configuration forming pockets providing ridges 27, 28, and 29 resting against the vehicle header or pillar 30. These ridges may include ports as shown at 23 in FIG. 5, but can provide an additional function acting as separate cushioning structures on an impact which will produce a condition similar to the un-deployed condition of FIG. 8. The force-deflection deformation of the walls of the ridges 27-29 can provide a considerable supplemental cushioning effect, apart from the forces generated by the trapped gases, since the ridges will buckle under impact and tend to improve the square wave shape of the force-deflection curve of FIG. 2 curve F.

Figure 9:
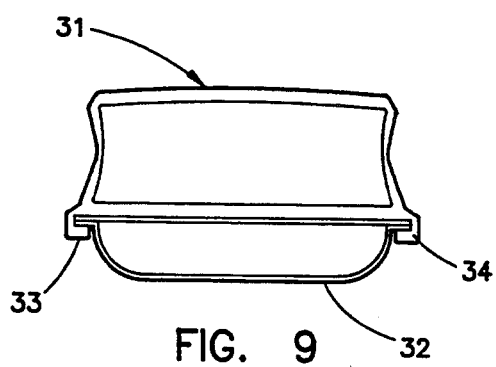
FIG. 9 illustrates a simple modification of the pad, showing one form of retention of the pad on the vehicle structure.
Figure 10:
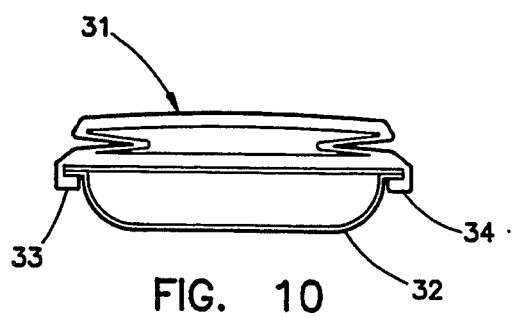
FIG. 10 shows the structure of FIG. 9 in the un-deployed condition.

FIGS. 9 and 10 show a simple method of attaching a protective pad to the vehicle structure. The pad 31 is secured to the pillar 32 by the integrally-molded snap fastening clips 33 and 34, which may either be continuous along the edges of the pad, or may be isolated at spaced points. The elastomeric material used to mold the air pad allows elastomeric snap fasteners to be integrally molded.

Figure 11:
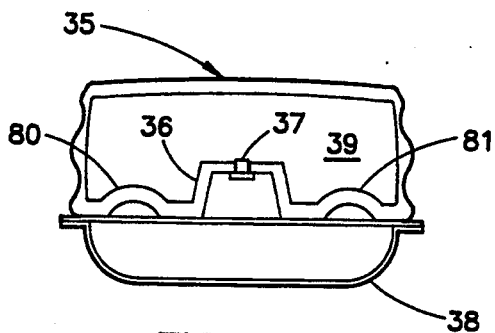
FIG. 11 illustrates a further modification, in which the mounting base of the pad is provided with an offset creating a channel in conjunction with the vehicle structure, with the wall of the pad having an exhaust port temporarily plugged by a dischargeable member.

FIG. 11 illustrates a modification adapted to provide a selected degree of energy absorption on impact. The pad 35 has the central offset 36 provided with a port similar to that shown at 23 in FIG. 5, but this port is temporarily occupied by the fire-off plug 37. Discharge of this plug on increase in the pressure within the pad on impact will induce a flow out through the ports, and between the pad and the pillar 38 on which it is mounted. The plug 37 can be adapted to fit within the port with a sufficient degree of retention such that a pressure within the chamber 39 of approximately 30 lbs. per square inch is required for dislodgement. It should be noted in passing that all of these pad configurations should be considered as expendable, since the vehicle will usually be damaged beyond repair in the course of an accident severe enough to cause deployment. It thus will not be necessary to be concerned about a technique for the replacement of the plugs 37. The control of the pressure which must be reached before exhausting of any of the contents of the chamber 39 makes it possible to produce a force-deflection relationship which approaches an ideal square wave, which will allow maximizing energy absorption for a given space packaging dimension as demonstrated by FIG. 2, curve D.

Figure 12:
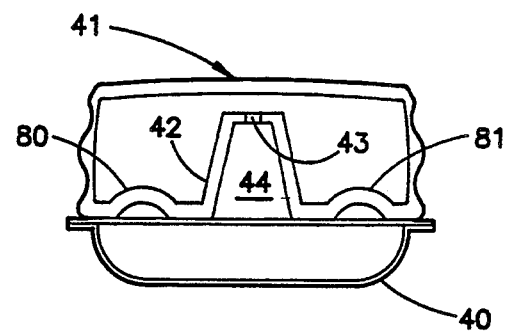
FIG. 12 illustrates an arrangement similar to that of FIG. 11, but without the dischargeable "fire off" member.

Referring to FIG. 12, the pillar 40 of a vehicle is shown equipped with a pad 41 with a considerably enlarged central offset 42 equipped with an exhaust port 43. This configuration provides an enlarged sub-chamber 44 which will have highly damped compressibility characteristics, in addition to the functioning as a discharge passage leading into the gaps that will exist between the pillar 40 and the pad 41.

Figure 13:
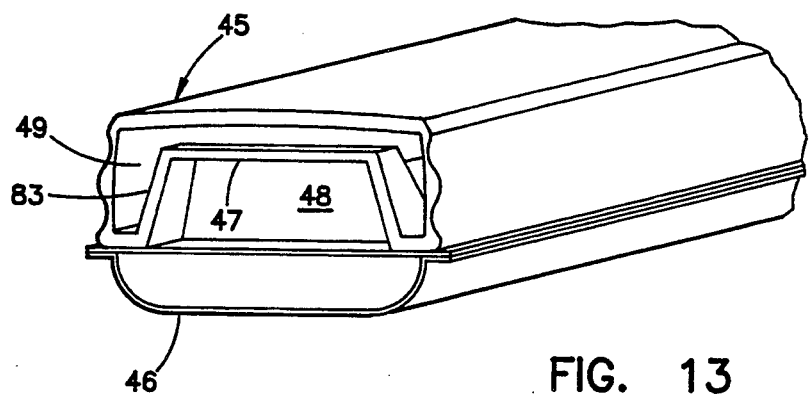
FIG. 13 illustrates a further modification of the invention involving a relatively large offset portion occupying most of the spaced defined by the exterior walls.

Referring to FIG. 13, the pad 45 mounted on the pillar 46 has an offset 47 that occupies most of the space within the exterior walls of the pad. This arrangement makes it possible to establish a succession of force-resistance relationships during impact by the progressive build-up of different dynamic pressures within the inner and outer chambers 48 and 49. FIG. 14 shows the securing of a pad 50 to the header or pillar 51 with the side clips similar to those indicated at 33 and 34 in FIG. 9. The clips 52 and 53 may also be either continuous, or isolated and spaced along the pillar. In FIG. 15, the simple form of the pad shown at 67 is secured to the pillar 55 primarily by adhesive.

Figure 16:
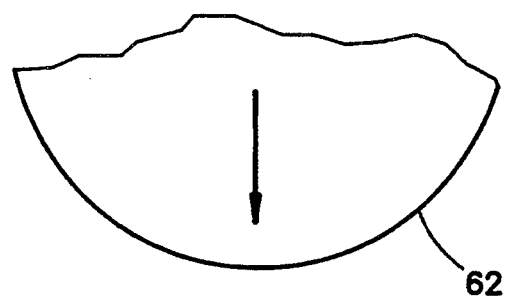
FIG. 16 shows a further modification of the invention providing for retention of an inflatable pad in the compressed condition.
Figure 16:
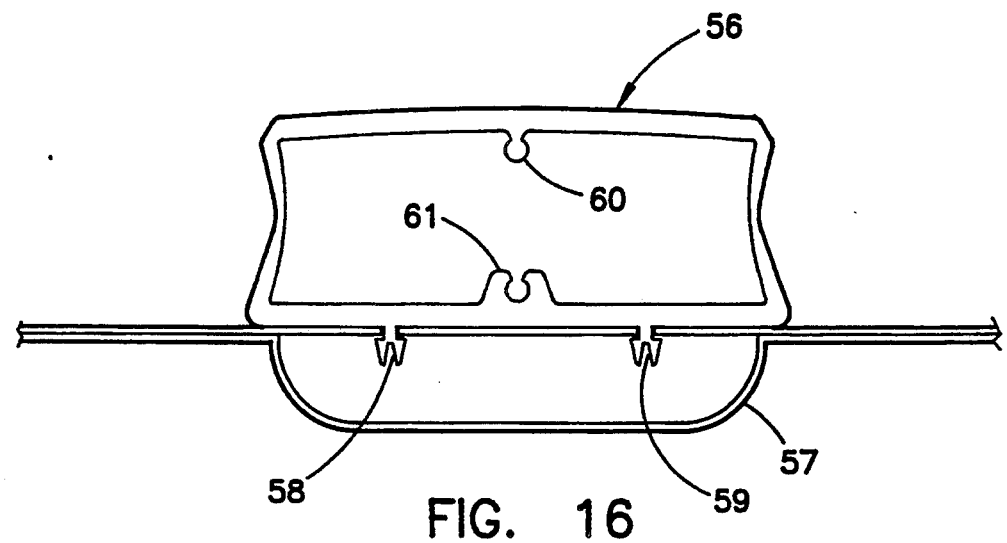
Figure 17:
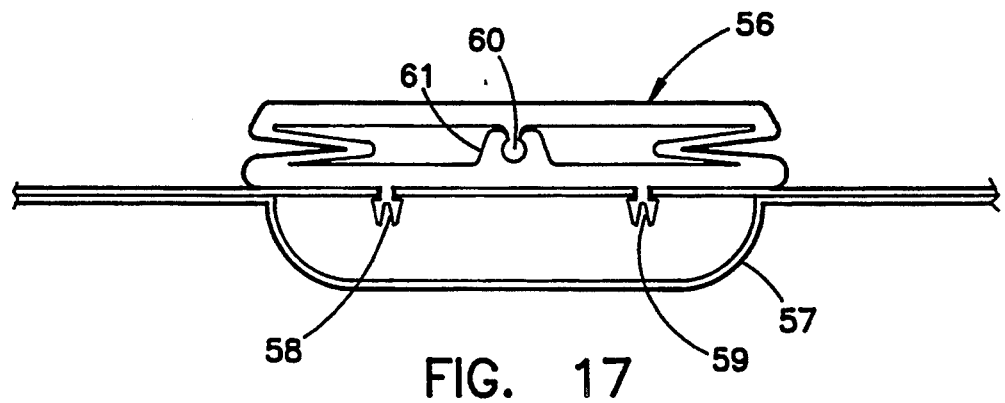
FIG. 17 shows the un-deployed condition of the pad illustrated in FIG. 16.

Referring to FIGS. 16 and 17, the inflatable pad 56 is shown mounted on the vehicle structure 57 with the snap-in projections 58 and 59 engaged in appropriate openings in the vehicle structure 57. These may be held in place either by bonding, mechanical fasteners, natural resilience, or may be heat-staked. The pad 56 also has the elements 60 and 61 which can be interengaged as shown in FIG. 17 to maintain the pad in the compressed condition to minimize its intrusion into the interior space in the vehicle. On being inflated by an appropriate device to the deployed condition shown in FIG. 16, the elements 60 and 61 are easily separated by the forces resulting from the injected gas pressure. The impact of an occupant's head shown schematically at 62 will thus encounter a vastly more hospitable surface than the unpadded vehicle structure.

Figure 18:
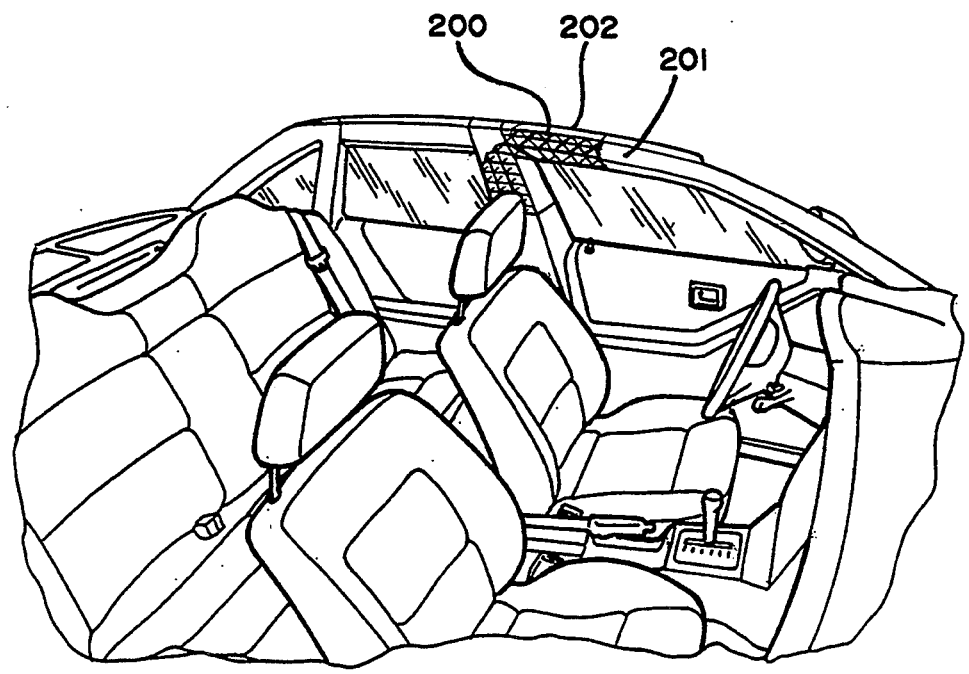
FIG. 18 shows an air pad and a break-out section displaying egg crate ribs.
Figure 19:
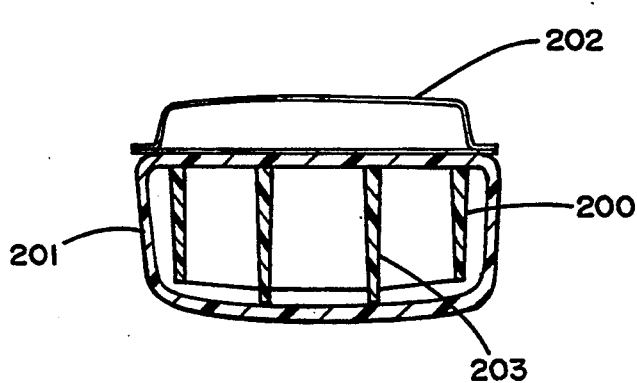
FIG. 19 is a section through a pad secured to the exterior of a header rail, and shows walls adapted to collapse on impact.
Figure 20:
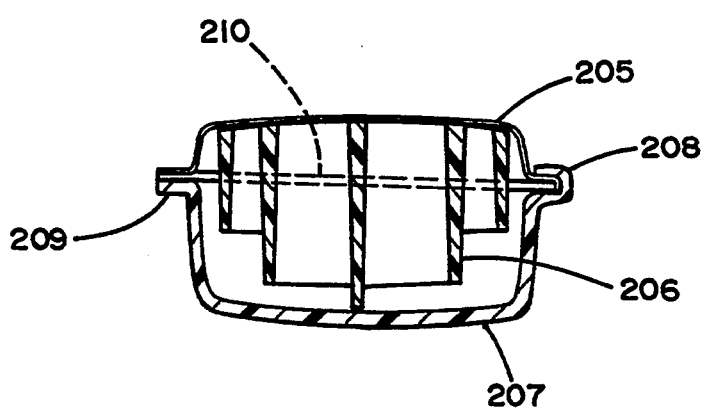
FIG. 20 is similar to FIG. 18, but uses the space within the header.

Referring to FIG. 18, an air pad embodiment is shown installed on the vehicle door beam and header rail 202 with break-out sections displaying elastomeric egg crate absorbers 200 comprising a plurality of elongated polygonal tubular channels having side walls extending between the front face (outer) [(inside)] surface 207 of the air pad body and back face (inner) [(outside)] surface of the air pad. The elastomeric egg crate absorber 200 is shown in section view in FIG. 19, and serves to hold the air pad 201 in position on header rail 202 prior to impact. FIG. 20 shows an embodiment in which the egg crate absorber 206 is recessed into the header rail 205, thereby providing maximum controlled deformation of the air pad prior to bottoming-out on the vehicle hard structure 205. Snap fastener 208 and mechanical fastener 209 are shown. An opening in the vehicle structure receiving a part of the pad components is indicated at 210.

I claim:

1. A resilient, shock absorbing cover for exposed interior portions of vehicle door column and door header members in the enclosure of a vehicle passenger compartment that are in a position where they can contact the head of a vehicle occupant during an accident, the cover comprising a hollow body attached to and covering the exposed portion of the member, the body being integrally formed of a moldable elastomeric resin and having a characteristic shape in an undeflected state, the body including:
   a base wall mounted against the member;
   collapsible elastomeric side walls extending outwardly from opposite sides of the base wall; and
   an outer wall extending between and enclosing outer ends of the side walls and forming the outer surface of the body, the outer wall being formed in a predetermined shape so as to provide the outer surface of the cover for the member,
   the base, side and outer walls forming an enclosed pneumatic chamber that cushions the member against inwardly directed impact forces from the head of a vehicle occupant during an accident, the cover being constructed so as to have force-deflection characteristics that are designed to reduce head injuries, the pneumatic chamber being expanded and filled with air at approximately atmospheric pressure when the cover is in its normal, undeflected state, the air becoming pressurized with inward deflection of the outer wall toward the base wall, the air thereby resisting inward deflection of the cover, the shock absorbing cover further including restrictive outlet means from the pneumatic chamber that permits a restricted outflow of air from the pneumatic chamber as the chamber is collapsed by inward deflection of the body, the air thus dissipating inward deflection forces on the body by providing non-resilient yieldable resistance to inward deflection of the body.

2. A shock absorbing cover according to claim 1, wherein the body includes internal reinforcement means for providing additional resistance to inward collapse of the outer wall toward the base wall for at least a portion of the distance between the outer wall and the base wall, the internal reinforcement means comprising internal walls extending at least part way between the base wall and the outer wall, the internal walls engaging the outer wall as it is deflected inwardly toward the base wall and buckling inwardly to provide additional resistance to continued inward deflection of the outer wall.

3. A shock absorbing cover according to claim 2, wherein the reinforcement means comprises a hollow internal pillar formed by the internal walls and a top extending between outer ends of the internal walls, the pillar extending from the base at least a portion of the way toward the outer wall, the pillar having an open interior.

4. A resilient, shock absorbing cover for exposed interior portions of vehicle door column and door header members in the enclosure of a vehicle passenger compartment that are in a position where they can contact the head of a vehicle occupant during an accident, the cover comprising a hollow body attached to and covering the exposed portion of the member, the body being integrally formed of a moldable elastomeric resin and having a characteristic shape in an undeflected state, the body including:

a base wall mounted against the member;

collapsible elastomeric side walls extending outwardly from opposite sides of the base wall;

an outer wall extending between and enclosing outer ends of the side walls and forming the outer surface of the body, the outer wall being formed in a predetermined shapes so as to provide the outer surface of the cover for the member; and the base side and outer walls forming an enclosed pneumatic chamber that cushions the member against inwardly directed impact forces from the head of a vehicle occupant during an accident, the cover being constructed so as to have force-deflection characteristics that are designed to reduce head injuries, the body including internal reinforcement means in the pneumatic chamber for providing additional resistance to inward collapse of the outer wall toward the base wall for at least a portion of the distance between the outer wall and the base wall, the internal reinforcement means comprising a hollow internal pillar having internal walls extending at least part way between the base wall and the outer wall, a top extending between outer ends of the internal walls, the pillar having an open interior, the top of the pillar engaging the outer wall as it is deflected inwardly toward the base wall and buckling the internal walls inwardly to provide additional resistance to continued inward deflection of the outer wall, the pillar including outlet means for providing at least a restricted outlet for air flow from the interior of the pillar to the outside of the body, the pillar augmenting the shock absorbing action of the cover by providing nonresilient resistance to collapse the body.

5. A shock absorbing cover according to claim 4 and further comprising interior opening means in the pillar for providing at least restricted air flow from the body pneumatic chamber into the interior of the pillar, such that the air in the body can be discharged from the body through the pillar, augmenting the shock absorption characteristics of the cover.

6. A shock absorbing cover according to claim 5 and further comprising a plug in the interior opening that is dischargeable into the interior of the pillar when the pressure differential between the pneumatic chamber and the interior of the pillar reaches a predetermined level.

7. A shock absorbing cover according to claim 4 wherein the body includes at least one pillar extending from the base wall towards the outer wall with no outlet between the body pneumatic chamber to the interior of the pillar.

* * * * *